Sept. 11, 1962 W. E. STANGER 3,053,357
CAPTIVE NUT WITH BOLT GUIDING MEANS
Filed Dec. 31, 1958
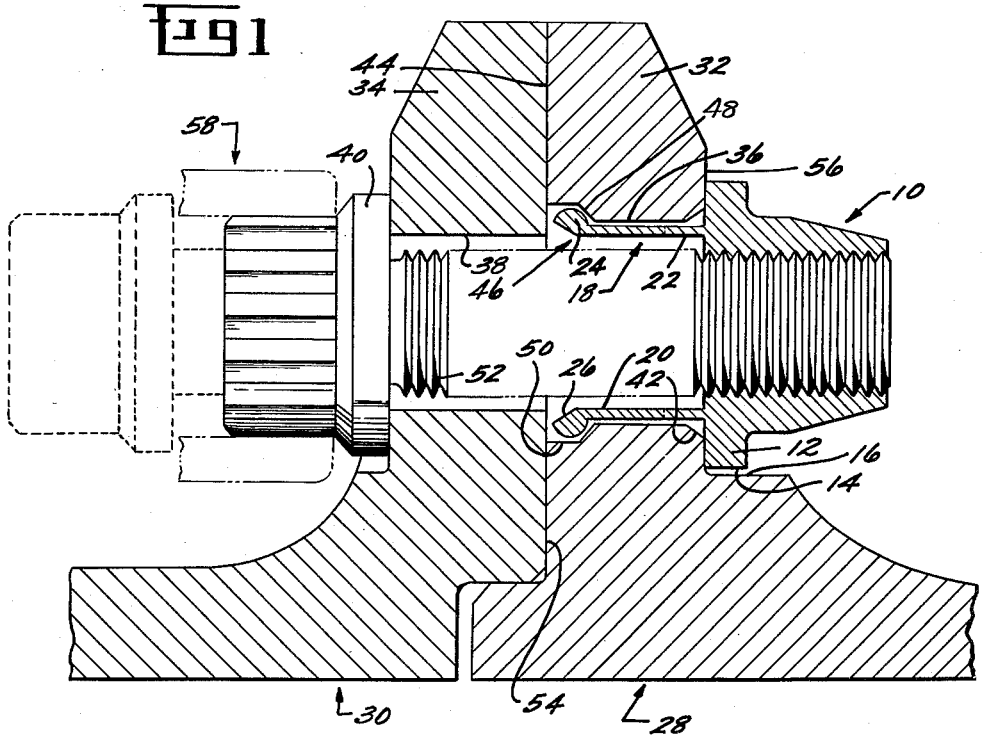
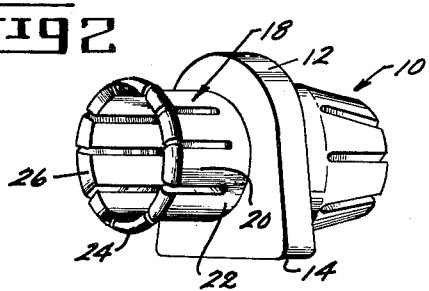
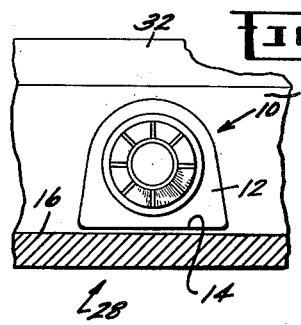
INVENTOR.
WALTER E. STANGER
BY
Harry C. Burgess
ATTORNEY—

# United States Patent Office 3,053,357
Patented Sept. 11, 1962

3,053,357
CAPTIVE NUT WITH BOLT GUIDING MEANS
Walter E. Stanger, Cincinnati, Ohio, assignor to General Electric Company, a corporation of New York
Filed Dec. 31, 1958, Ser. No. 784,389
1 Claim. (Cl. 189—36)

The present invention relates to fasteners for use in blind or inaccessible locations and, more particularly, to a nut adapted to be held capitive on an apertured flange, in a receiving position for a remotely-maniplated bolt.

When assembling parts in blind or inaccessible locations it is frequently necessary to employ remote-handling devices, such as mechanical "manipulators" having tool holders. The obvious difficulties associated with the use of remotely-controlled handling devices are increased when it is desired to use fasteners which must be threaded together. For example, if it were desired to use a nut and bolt to fasten together two heavy machinery flanges it would be very difficult to remotely assemble the nut and bolt without the danger of cross-threading. Depending upon the location of the machinery parts, it might be impossible, or at least extremely difficult, to manipulate both the nut and the bolt during assembly. Also, assembly time could be greatly shortened for say, remotely-located parts having flanges requiring 100 or more fasteners, if the need to remotely-install a nut for each bolt could be eliminated. A related problem is that of preventing nut rotation while the bolt is being threaded therein from a position remote of the nut location. A number of means are known which will hold a nut firmly on a flange in a bolt-receiving position and prevent nut rotation. However, such devices usually comprise thin sheet metal cages or clamps unsuitable for use with heavy machinery requiring fasteners able to withstand very high tightening torques. In addition, such fasteners usually require assembling procedures which make them highly undesirable for use with remote-handling devices. A nut could be welded in position on the flange to receive the bolt, but this is expensive and presents problems in alignment since the nut can no longer move to meet the bolt. Also it would be difficult to remove a welded nut that had become damaged, e.g., by the threads being stripped during assembly with a bolt, if the flange were in a blind or inaccessible position. The entire flange could be moved closer at hand, of course, but if the damaged fastener were but one of many being utilized, the time lost in disassembling the flange would be prohibitive.

Accordingly, an object of the present invention is to provide a fastener in the form of a nut adapted for use with heavy machinery flanges having a remote-handling feature enabling the nut to be held captive on a flange.

Another object is to provide a fastener for use with a bolt in the form of a nut having means enabling the nut to be held captive on a heavy machinery flange, the means also coacting with the flange to firmly align the nut in bolt-receiving position to prevent cross-threading of the nut and bolt.

A further object is to provide a rugged yet simple, easily replaced and reusable one piece fastener in the form of an improved nut having means enabling it to be held captive on an apertured heavy machinery flange in a bolt-receiving position, the nut means also cooperating with the flange aperture and the bolt to prevent cross-threading of the nut and bolt when the bolt threads are remotely manipulated into engagement with the nut threads.

Briefly stated, in accordance with one embodiment of my invention, I provide fastening means, particularly useful where direct human contact with the fastener in use is impossible or impractical, in the form of a nut for use with a bolt and an apertured heavy machinery flange, the nut having an axial extension with a resilient portion enabling the nut to be held captive on the flange and adapted to coact with the flange upon insertion of the bolt to grip the bolt and center the nut relative thereto to prevent cross-threading when the nut and bolt are assembled using a remote-handling device.

While the specification concludes with a claim particularly pointing out and distinctly claiming the subject matter which I regard as my invention, it is believed that the invention will be better understood and other objects become more apparent from the following description and accompanying drawings in which:

FIGURE 1 is an elevation view, partly in section of the improved fastener in use;

FIGURE 2 is a perspective view of the nut; and

FIGURE 3 is an end view of the nut inserted in the flange.

Referring now more specifically to the drawings, one form of a fastening device embodying the features of my invention is shown in FIGURE 1. The fastener comprises an internally-threaded nut indicated generally at 10 having a base in the form of a peripheral shoulder 12. A flat surface 14 on the circumference of the shoulder is adapted to cooperate with a ledge 16 on the part to be assembled to lock the nut against rotation. The exterior configuration of the nut may be of any suitable design capable of being gripped by a remotely-controlled manipulating tool or "claw," such as indicated generally at 58. In the embodiment shown in FIG. 1 the nut is a standard commercial lock-nut.

Projecting from the nut 10, along its axis, is a hollow neck, indicated generally at 18, containing a plurality of leaves 20 having smooth inner surfaces. The leaves join at the end of the neck adjacent the shoulder to form a solid band 22. At the other end of the neck is a raised portion in the form of a segmented lip 24. The lip end is internally chamfered at 26 to aid insertion of a bolt. Although the lip is shown as being semi-circular in cross-section, a lip being triangular or rectangular in cross-section could be used in keeping with the spirit of my invention.

Indicated generally at 28 and 30 are two typical heavy machinery parts, e.g., jet engine casings. The parts have abutting members or flanges 32 and 34 containing apertures 36 and 38, respectively, which are capable of receiving a bolt 40, aperture 36 also having a bevel 42 at one end to aid insertion of the neck. At the other end of the aperture 36, i.e., on the mating surface 44 of flange 32, is an enlarged or countersunk section indicated generally at 46 having a bottom wall in the form of a truncated cone 48. The upper or cylindrical portion 50 of the countersink is made larger in diameter than the segmented lip 24 so that the lip may be positioned therein without any resultant strain on the leaves 20 due to pressure being exerted on the leaves by the cylindrical wall of the countersink pressing on the lip segments. This will allow the nut to be replaced many times without any serious permanent distortion of the resilient leaves.

Where the heavy machinery parts to be assembled will eventually be installed in a blind or inaccessible location, it is anticipated that my improved nut will be installed in flange 32 prior to mating of the latter with the flange shown at 34. Installation of the nut may be accomplished manually using any suitable tool. When the neck 18 is inserted in the aperture 36, the resilient leaves 20 will flex radially inward sufficient to allow the lip 24 to pass through the aperture to a point adjacent the countersink 46. At this point the leaves will start to spring radially outward and when the nut shoulder 12 is abutting the flange the leaves will have assumed a position substantially equal to that existing before the nut was thrust into the aperture. With the lip positioned in the countersink, the nut is held in a loose fit in the aperture 36 since the inside diameter of this aperture is designed to be slightly larger than the outside diameter of the hollow neck 18. This is desirable, however, so that any misalignment of the nut and bolt may be compensated for by slight adjustment of either the nut or bolt.

It is obvious from the above description that my improved nut is also well adapted to being removed, or installed, remotely using remote-handling devices such as the manipulating tool 58. For example, should it be necessary to replace a damaged nut situated on a machinery flange in an inaccessible location, the nut head 10 need only be grasped by the manipulator and a pulling force exerted on the head sufficient to cause the leaves 20 to flex enough to allow the lip 24 to compress to the same diameter as the aperture 36. Although the lip segments will be in sliding engagement with the aperture walls, the leaves are resilient enough so that the resulting friction does not tend to appreciably restrict removal of the nut. A replacement nut may then be installed by using the manipulator to exert a pushing force to insert the neck 18 in the aperture 36.

To utilize my invention in assembling the casings in a remote location, flanges 32 and 34 are brought together and apertures 36 and 38 placed in substantial alignment to permit passage therethrough of the bolt 40. The bolt is then grasped by the manipulating tool 58 and inserted through the apertures. After insertion of the bolt, it is pushed against the nut to engage the nut and bolt threads. This pushing force tends to move the nut out of the aperture 36 which causes the segmented lip 24 to contact the wall of the truncated cone 48. As the lip segments bear on the cone wall, the leaves 20 will start to flex radially inward due to the inward slope of the cone but will almost immediately come in contact with the threaded bolt shank 52. The lip will be unable to slip out of the countersink and into the aperture since the bolt prevents the leaves from flexing sufficiently. At this point the pushing force is increased slightly, causing the leaves to grip the bolt harder. Since this gripping force is distributed equally around the circumference of the bolt shank 52 the result is alignment of the axis of the bolt and the nut 10. As this pushing force is increased the lip segments will also tend to bear harder against the wall of the truncated cone 48. Since both the lip and the cone are circular, there is a tendency for each lip segment to press with equal force against the cone wall, with the result that the nut is firmly positioned in the flange. At the same time, more alignment force is provided since the nut no longer rocks in the aperture. With alignment of the nut and bolt and firm positioning of the nut thus being accomplished, the bolt may be rotated by a wrench held in the manipulating tool 58 without fear of cross-threading. The nut is unable to rotate, of course, since the flat surface 14 on the nut shoulder will cooperate with the ledge 16 on the assembled part 28 to prevent it.

In addition to the countersink in the mating surface 44 of the flange 32, it is obvious that the aperture 38 in flange 34 could be counterbored to form a recess on the mating surface 54 of the flange which would admit the segmented lip 24 in keeping with the spirit of my invention. The aperture in flange 32 would then be chamfered at both ends to facilitate insertion and removal of the neck 18, the chamfer on the mating surface 44 performing the same function as the truncated cone 48.

Other means of preventing nut rotation could be utilized with my invention. For example, a segment of the periphery of the shoulder 12 could be extended laterally to form a locking flange adapted to cooperate with the casing flange 32 to prevent rotation of the nut. Another means of preventing nut rotation would be to provide a shallow recess in the outer surface 56 of the flange 32, concentric of the aperture 36, having a configuration similar to that of the nut head.

The invention has proven to be simple in construction, yet rugged and reliable, being particularly useful with heavy machinery flanges requiring a relatively large number of fasteners. It has also proven especially desirable for use in locations where workmen are unable to come into direct contact with the nut and bolt, i.e., where the use of remote-controlled "manipulators" is indicated.

While I have illustrated a specific form of my invention it is understood that I do not intend to limit myself to this exact form but intend to claim my invention broadly as indicated by the appended claim.

I claim:

In combination, a pair of abutting members having aligned openings therethrough and means for fastening said members together comprising,
 a threaded bolt,
 an internally threaded nut having a non-circular periphery,
 a flat surface on one member positioned adjacent said periphery of said nut and interlocking therewith to prevent said nut from turning,
 a neck connected to and extending along the axis of said nut and inserted through the opening in one member,
 said neck having a smooth inner bore,
 said neck being slotted to provide a plurality of longitudinally extending resilient members forming a part of said neck,
 said opening through one member having one section of larger diameter having at least the side toward the nut tapered,
 said resilient members having an enlarged portion with an inclined external surface positioned in said enlarged section,
 said tapered section and said enlarged portion coacting such that when said neck is moved longitudinally said resilient members are forced radially inward,
 said bolt shaped to extend through the abutting member remote from said nut with the threads thereon interfitting with the threads of said nut,
 said bolt being of a diameter wherein the difference between the bolt outside diameter and said smooth bore inside diameter is less than the difference between the outside diameter of said enlarged portion and the diameter of said aligned openings whereby, when said bolt is inserted into said opening to be threaded in said nut said smooth bore aligns said bolt and nut and said enlarged portion maintains said nut in said opening.

References Cited in the file of this patent

UNITED STATES PATENTS

| | | |
|---|---|---|
| 259,234 | Stevens | June 6, 1882 |
| 377,185 | Anderson | Jan. 31, 1888 |
| 922,132 | Gold | May 18, 1909 |
| 1,249,827 | Putnam | Dec. 17, 1917 |
| 1,978,935 | Douglas | Oct. 30, 1934 |
| 2,259,720 | Amesbury | Oct. 21, 1941 |
| 2,555,483 | Grant | June 5, 1951 |
| 2,649,884 | Westover | Aug. 25, 1953 |